US009516738B2

(12) United States Patent
Wittmann et al.

(10) Patent No.: US 9,516,738 B2
(45) Date of Patent: Dec. 6, 2016

(54) PLASMA TORCH ELECTRODE MATERIALS AND RELATED SYSTEMS AND METHODS

(71) Applicant: Hypertherm, Inc., Hanover, NH (US)

(72) Inventors: Markus Wittmann, Hanover, NH (US); John Peters, Canaan, NH (US); E. Michael Shipulski, Etna, NH (US)

(73) Assignee: Hypertherm, Inc., Hanover, NH (US)

( * ) Notice: Subject to any disclaimer, the term of this patent is extended or adjusted under 35 U.S.C. 154(b) by 139 days.

(21) Appl. No.: 14/500,270

(22) Filed: Sep. 29, 2014

(65) Prior Publication Data

US 2015/0090700 A1 Apr. 2, 2015

Related U.S. Application Data

(60) Provisional application No. 61/884,712, filed on Sep. 30, 2013.

(51) Int. Cl.
*B23K 10/00* (2006.01)
*H05H 1/34* (2006.01)

(52) U.S. Cl.
CPC ........ *H05H 1/34* (2013.01); *H05H 2001/3442* (2013.01); *Y10T 29/49208* (2015.01)

(58) Field of Classification Search
CPC ..... H05H 1/34; H05H 2001/3442; H05H 1/26
USPC ........................... 219/121.48, 121.52, 74, 75
See application file for complete search history.

(56) References Cited

U.S. PATENT DOCUMENTS

| | | | | |
|---|---|---|---|---|
| 3,198,932 | A * | 8/1965 | Weatherly .............. | B23K 9/296 219/120 |
| 3,758,746 | A | 9/1973 | Bykhovsky et al. | |
| 3,930,139 | A | 12/1975 | Bykhovsky et al. | |
| 5,767,478 | A * | 6/1998 | Walters .................... | H05H 1/34 219/119 |
| 2002/0125224 | A1* | 9/2002 | Cook ....................... | H05H 1/34 219/121.48 |
| 2012/0199562 | A1* | 8/2012 | Friedel ................. | B23K 10/006 219/121.44 |

FOREIGN PATENT DOCUMENTS

| | | |
|---|---|---|
| WO | 0005931 | 2/2000 |

OTHER PUBLICATIONS

Stacy et al., The Yttria-Hafnia System, Journal of the American Ceramic Society, Jul. 1975, pp. 285-288, vol. 58, Issue 7-8, Wiley-Blackwell, USA, (4 pages).

* cited by examiner

*Primary Examiner* — Mark Paschall
(74) *Attorney, Agent, or Firm* — Prokauer Rose LLP

(57) ABSTRACT

In some aspects, multi-metallic emissive inserts shaped to be disposed within an electrode for a plasma arc torch electrode can include an exposed emitter surface at a distal end of the emissive insert to emit a plasma arc from the electrode, wherein the emissive insert comprises a first emissive material and about 8 weight percent to about 50 weight percent yttrium.

33 Claims, 7 Drawing Sheets

PLASMA TORCH ELECTRODE MATERIALS AND RELATED SYSTEMS AND METHODS

RELATED APPLICATIONS

This application claims priority from U.S. Provisional Application No. 61/884,712, filed Sep. 30, 2013, the contents of which are hereby incorporated herein by reference in their entirety.

TECHNICAL FIELD

This application relates generally to thermal cutting torches (e.g., plasma arc torches), and more specifically to plasma torch electrode materials and related systems and methods.

BACKGROUND

Plasma arc torches are widely used in the processing (e.g., cutting and marking) of metallic materials. A plasma arch torch generally includes a torch body, an electrode mounted within the body, a nozzle with a central exit orifice, electrical connections, passages for cooling and arc control fluids, a swirl ring to control the fluid flow patterns, and a power supply. The torch produces a plasma arc, which is constricted to produce a jet of plasma gas with high temperature and high momentum. The gas can be non-reactive, e.g. nitrogen or argon, or reactive, e.g. oxygen or air.

In plasma arc cutting or marking a metallic workpiece, a pilot arc is typically first generated between the electrode (cathode) and the nozzle (anode). Controlled gas flow pushes the pilot arc through the nozzle and out the exit orifice. The pilot arc extends beyond the nozzle until the electrical resistance between the electrode and the workpiece is reduced enough to allow transfer of arc attachment from the nozzle to the workpiece. Cutting and marking are done with the torch operating in this transferred plasma arc mode, characterized by the flow of electrons and conductive ionized gas from the electrode to the workpiece.

In a plasma arc torch using a reactive plasma gas, it is common to use a copper electrode containing an insert made of a material capable of thermionic emission, which can be in the form of an insert. The insert is press fit into the bottom end of the electrode so that an end face of the insert, which defines an emission surface, is exposed. The insert is typically made of either hafnium or zirconium and is cylindrically shaped.

SUMMARY

In some aspects, an electrode for a plasma arc torch can include a body formed of an electrically conductive material, the body having a first end and a second end; and an emissive portion comprising a multi-metallic insert disposed within the first end, the multi-metallic insert including at least two non-oxidized metallic materials, one of the non-oxidized metallic materials being about 5 weight percent to about 50 weight percent of metallic yttrium.

Embodiments described herein can include one or more of the following features.

The multi-metallic insert can include at least one of hafnium or zirconium. The multi-metallic insert can be substantially free of oxygen. In some embodiments, after an operational usage of the electrode, a thermionic emitter surface layer can be formed along an exposed surface of the multi-metallic insert, the thermionic emitter surface layer having a composition different than a composition of a non-exposed portion of the multi-metallic insert. In some embodiments, a portion of the multi-metallic insert comprises non-alloyed, discrete regions of yttrium. In some embodiments, the multi-metallic insert includes one or more discrete regions of a base material within the yttrium metal. The multi-metallic insert can include a region of yttrium disposed about a set of one or more wires formed of hafnium or zirconium. In some embodiments, the multi-metallic insert includes about 10 weight percent to about 25 weight percent yttrium (e.g., about 12 weight percent to about 25 weight percent, e.g., about 15 weight percent to about 25 weight percent yttrium).

In some embodiments, the multi-metallic insert can include an emissive surface with a surface area exposed to plasma gas, the emissive surface area having a size that is selected in coordination with an operating current carried by the electrode so that a current density during cutting is between about 35,000 amperes/inch$^2$ to about 37,000 amperes/inch$^2$.

In some embodiments, the multi-metallic insert can also include at least one of calcium or magnesium. In some embodiments, the two non-oxidized metallic materials can be alloyed together. The multi-metallic insert can be in contact with the body. In some embodiments, the multi-metallic insert can have an oxygen-rich environment material loss rate of about 5 nanograms per coulomb. In some embodiments, the multi-metallic insert can include an inner first portion and an outer second portion, the second portion being formed of an emitter alloy with a liquid phase change temperature of greater than about 2800 degrees Celsius.

In some aspects a plasma arc torch for a plasma cutting system can include: a torch body; a nozzle disposed within the torch body; and an electrode mounted relative to the nozzle in the torch body to define a plasma chamber, where the electrode includes an electrode body formed of a thermal conductivity material, the electrode body having a first end and a second end defining a longitudinal axis; and an emissive portion comprising a multi-metallic insert disposed within the first end, the multi-metallic insert including at least two non-oxidized metallic materials, one of the non-oxidized metallic materials being about 5 weight percent to about 50 weight percent of metallic yttrium.

Embodiments can include one or more of the following features.

The multi-metallic insert can include about 10 weight percent to about 25 weight percent yttrium (e.g., about 12 weight percent to about 25 weight percent, e.g., about 15 weight percent to about 25 weight percent yttrium). The multi-metallic insert can include an emissive surface with a surface area exposed to plasma gas, the emissive surface area having a size that is selected in coordination with an operating current carried by the electrode so that a current density during cutting is between about 35,000 amperes/inch$^2$ to about 37,000 amperes/inch$^2$.

In some aspects, a multi-metallic emissive insert shaped to be disposed within a plasma arc torch electrode can include an exposed emitter surface at a distal end of the emissive insert to emit a plasma arc from the electrode, wherein the emissive insert comprises a first emissive material and about 5 weight percent yttrium to about 50 weight percent yttrium.

Embodiments can include one or more of the following features.

In some embodiments, the yttrium and the first emissive material are alloyed in at least one region along the emitter surface after a use of the emitter. The emissive insert can include at least one other material in addition to the first emissive material and the yttrium. The multi-metallic insert can include about 12 weight percent yttrium to about 30 weight percent yttrium. The emitter surface can define a surface area configured to be exposed to plasma gas, the emitter surface area having a size that is selected in coordination with an operating current carried by the electrode so that a current density during cutting is between about 35,000 amperes/inch$^2$ to about 37,000 amperes/inch$^2$. In some embodiments, the emissive insert of can include a thermionic emitter surface layer formed along the emitter surface after at least one usage, the thermionic emitter surface layer comprising a different material composition than a remaining portion of the multi-metallic insert. The emissive insert can include discrete regions of yttrium and hafnium. The elongated emissive insert can have a generally cylindrical shape. The first emissive material can include hafnium or zirconium. The emissive insert can be disposed within a plasma arc torch electrode.

In some aspects, a method can include forming a multi-metallic region of an emitter insert for a plasma arc torch electrode, the multi-metallic region comprising a first emissive material and about 5 weight percent to about 50 weight percent yttrium metal; and disposing the emitter insert in a recess formed at an end of the plasma arc torch electrode.

Embodiments can include one or more of the following features.

In some embodiments, the forming the multi-metallic region can include forming discrete regions of the yttrium metal. In some embodiments, at least one of the discrete regions can at least partially surround at least a portion of the first emissive material. The method can further include treating at least a portion of the multi-metallic region, thereby forming an emitter layer comprising a combined region of the base material and the yttrium metal. The treating can include supplying a current to heat. The method can further include forming a layer of an alloy of the yttrium metal and the first emissive material. The method can further include forming an exposed layer comprising yttrium and oxygen. The emitter layer can have a thickness that is less than about 0.030 inches. The multi-metallic region can include about 15 weight percent yttrium to about 30 weight percent yttrium (about 12 weight percent yttrium to about 30 weight percent yttrium).

In some aspects, a method can include: coupling an electrode of a plasma arc torch to a power supply; supplying a current to the electrode; and forming an arc from an emitter of the electrode, wherein the emitter comprises a multi-metallic insert comprising about 5 weight percent to about 50 weight percent yttrium.

Embodiments can include one or more of the following.

The method can further include forming an emitter surface layer along an exposed surface of the multi-metallic insert, the thermionic emitter surface layer comprising a composition different than a composition of a non-exposed portion of the multi-metallic insert. The emitter can include discrete regions of the yttrium within an emissive metal. The multi-metallic insert includes about 12 weight percent yttrium to about 25 weight percent yttrium.

In some aspects, an electrode for a plasma arc torch can include: an electrode body having a first end and a second end; a bore defined along the first end; and a multi-metallic emissive insert disposed within the bore and including a first portion and a second portion, the first portion including yttrium and at least one of hafnium or zirconium.

Embodiments can include one or more of the following.

The second portion can be formed of an emitter alloy with a liquid phase change temperature of greater than about 2800 degrees Celsius. The emitter alloy can include yttrium and at least one of hafnium or zirconium. The emitter alloy can include about 8 weight percent to about 50 weight percent yttrium. The emitter alloy can include about 15 weight percent to about 25 weight percent yttrium. The emitter alloy can be formed after at least one use of the electrode. The second portion can be disposed along an exposed surface of the emissive insert. The first portion can include discrete regions of yttrium and the at least one of hafnium and zirconium. The first portion can include one or more hafnium regions disposed within an outer portion of yttrium. The emissive insert includes an emissive surface with a surface area exposed to plasma gas, the emissive surface area having a size that is selected in coordination with an operating current carried by the electrode so that a current density during cutting is between about 30,000 amperes/inch$^2$ to about 37,000 amperes/inch$^2$.

In some aspects, an electrode for a plasma arc torch can include: an electrode body having a first end and a second end; a bore defined in the first end; and an emissive insert disposed within the bore and including a proximal portion and a distal portion, the proximal portion being formed of an emitter composition comprising metallic yttrium.

Embodiments can include one or more of the following.

The emissive surface layer can include a different material composition than a remaining portion of the emissive insert and is formed after at least one usage. The emissive insert comprises one or more regions of at least one of hafnium or zirconium disposed in the metallic yttrium. The one or more regions can include one or more rods. The one or more rods can include at least one hafnium rod. The emissive insert can include one or more hafnium regions disposed within a conduit of metallic yttrium. The emissive insert can include at least one of hafnium or zirconium. The emitter alloy can include about 5 weight percent to about 50 weight percent metallic yttrium. The emitter alloy can include about 12 weight percent to about 30 weight percent metallic yttrium. The emitter alloy can include about 15 weight percent to about 25 weight percent metallic yttrium.

In some aspects, an emitter insert for an electrode for a plasma arc torch can include a proximal portion and a distal portion, the proximal portion being formed of a multi-metallic emitter composition comprising yttrium and the distal portion comprising an emissive surface layer having an atomic arrangement that is substantially consistent below a temperature of about 2800 degrees Celsius.

Embodiments can include one or more of the following.

The emissive surface layer can include a different material composition than a remaining portion of the emissive insert and is formed after at least one usage. The emitter insert can include one or more regions of at least one of hafnium or zirconium disposed in the yttrium. The one or more regions can include one or more rods. The emitter insert can include at least one of hafnium or zirconium. The emitter insert can include about 5 weight percent to about 50 weight percent yttrium. The emitter insert can include about 15 weight percent to about 25 weight percent yttrium.

In some aspects, an emitter for a plasma arc torch electrode can include: an emitter body shaped to be disposed within a bore of the electrode, the emitter body having an emitter surface layer formed along a distal end of the emitter body to support plasma arc generation, wherein the emitter body includes at least one of hafnium or zirconium and has an oxygen-rich environment material loss rate of less than about 5 nanograms per coulomb.

Embodiments can include one or more of the following.

The material loss rate can include losses as a result of material erosion. The emitter body can include about 8 weight percent to about 50 weight percent yttrium. The emitter body can further include discrete regions of yttrium and at least one of the hafnium or zirconium. The emitter body can include one or more regions of the hafnium or zirconium disposed within a conduit of yttrium. The emitter surface layer can be formed of an alloyed material after at least one operation cycle of the electrode, the emitter surface layer comprising a different material composition than a remaining portion of the emitter body.

In an aspect, a plasma arc torch electrode having an elongated body can include: an emitter disposed at a distal end of the electrode body, the emitter comprising: an emitter body shaped to be disposed within a bore at the distal end of the electrode, the emitter body having: a circumferential side surface defined about the emitter body and shaped to be received within the bore, and an emitter surface layer formed at a distal end of the emitter body, the emitter surface layer being configured to support plasma arc generation, wherein the emitter body includes at least one of hafnium or zirconium and has an oxygen-rich environment material loss rate of less than about 5 nanograms per coulomb.

Embodiments can include one or more of the following.

The material loss rate can include losses as a result of material erosion. The emitter alloy can include about 5 weight percent to about 50 weight percent yttrium. The emitter alloy can include about 12 weight percent to about 25 weight percent yttrium. The emitter body can further include regions of yttrium and at least one of the hafnium or zirconium. The emitter body can include one or more regions of the hafnium or zirconium disposed within a conduit of yttrium.

In some aspects, a method can include forming a multi-metallic composition region of an emitter insert for a plasma arc torch electrode, the multi-metallic composition region comprising a base material and a second material; disposing the emitter insert in a recess formed along an end of the electrode; and supplying a current to the electrode to generate a region of high temperature that mixes at least a portion of the multi-metallic composition region to form an emitter layer comprising a combined region of the base material and the second material.

Embodiments can include one or more of the following.

The forming the multi-metallic composition region can include forming one or more regions of the base material and second material. The base material can include at least one of hafnium or zirconium and the second material comprises yttrium. The multi-metallic composition region can include about 5 weight percent to about 50 weight percent yttrium. The multi-metallic composition region includes about 12 weight percent to about 25 weight percent yttrium.

Embodiments described herein can have one or more of the following advantages.

In some aspects, experimental results suggest that the electrode emitter composite materials described herein can extend (e.g., significantly extend or improve) electrode life of most or all plasma arc torch electrodes with small (e.g., minimal) additional cost of materials or manufacturing required.

The hafnium or zirconium alloys with yttrium (e.g., up to about 50 weight percent (e.g., about 8-30 weight percent) metallic yttrium) described herein can result in composite emitters with a reduced oxidation rate and fewer phase changes in the oxide material that forms along an exposed surface portion of the emitter. Since the emitter surface generally reaches temperatures in excess of 3000° C. during use and is exposed to reactive gases, it is typically being oxidized continually during use. The low conductivity of oxides means that, aside from a thin layer at the oxidation front, most oxides that forms will be liquid during operation and can be prone to ejection (e.g., being expelled from the emitter). Reducing the oxidation rate can improve emitter life by slowing the formation (and ejection) of liquid oxide during operation. While the mechanism by which rare earth elements (e.g., yttrium) lower oxidation rates of a base metal (e.g., hafnium) remains poorly understood, it is believed that the rare earth elements help to decrease isothermal oxidation rates and help to improve oxide adhesion following thermal cycling.

In some previous applications, less than about 1 weight percent rare earth elements has been found to be desired (e.g., optimal) to reduce oxidation rates. However, due to the high temperatures encountered during thermionic emission and the higher vapor pressure of rare earth elements, higher concentrations of rare earth elements may be desired to act as a reservoir to replace rare earth elements that evaporate from the surface during thermionic emission. Further, fewer phase changes may help to produce a more stable thermionic emitter with longer cycle life than those formed of pure hafnium or zirconium. Additionally, the materials described herein may reduce thermal stresses within the emitter (e.g., along the surface portion) that could otherwise lead to cracking, spalling (e.g., material flaking), and ejection of material during start/stop transients during which the composite metal/oxide structure undergoes severe temperature changes that induce multiple phase changes in the hafnium or zirconium oxide when not combined (e.g., alloyed) with yttrium.

In some aspects, the emitters described herein have been found to exhibit improved results, particularly during longer (in time duration) cuts. For example, during cuts that last about 20 to 60 seconds, extended life (e.g., double life) has been observed.

Additionally, in some aspects, consumer costs for consumables can be lowered by using electrodes with the alloyed emitters as described herein. For example, experimental data indicates that electrodes with emitters including yttrium (e.g., a yttrium alloy) can have reduced emitter erosion rates and a longer (e.g., doubled) usable life than a similar electrode having an emitter formed of only the base metal (e.g., hafnium). Additionally, the electrodes described herein having emitters formed of the yttrium alloy can produce improved cut quality due at least in part to more uniform and centralized pit formation and also by decreasing the amount of emitter material deposited on the nozzle. Experimental data also suggests that these benefits can be achieved in both air and oxygen plasma cutting.

Further, in some aspects, implementation of electrodes with emitters formed of hafnium-yttrium alloys can be backward compatible to existing plasma arc torch systems without a need for updating gas or current control to achieve a desired benefit.

DETAILED DESCRIPTION

In some aspects, an electrode for plasma arc torches can include an emitting region (e.g., an emissive insert) made from a material including some amount of yttrium, which can help to stabilize the material structure and extend (e.g., increase) the usable life of the emitting region.

Figure 1:
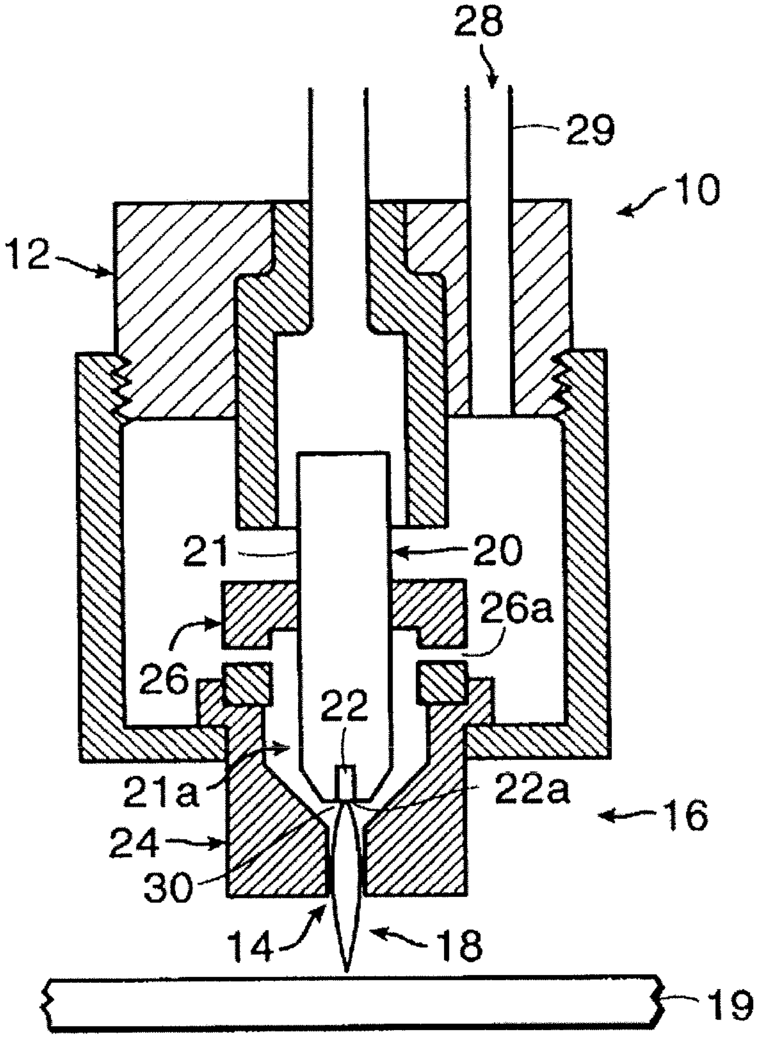
FIG. 1 is a schematic cross-sectional view of an example plasma arc torch including an electrode with an emitter insert formed of a metallic material including yttrium.

For example, referring to FIG. 1, a plasma arc cutting torch 10 can include a body 12 which is typically cylindrical with an exit orifice 14 at a lower end 16. The torch body 12 supports an electrode (e.g., a copper electrode) 20 having a generally cylindrical body 21. An emissive portion (e.g., emissive insert (e.g., an emitter)) 22 can be made of a combination of materials (e.g., metallic materials) including a base material, such as hafnium (Hf) or zirconium (Zr) as modified to include an amount of yttrium (Y), as discussed herein. The emitter 22 can be press fit into the lower end 21*a* of the electrode so that an emission surface (e.g., surface portion or region, such as a thermionic emitter surface layer) 22*a* is exposed.

The torch body 12 also supports a nozzle 24 that is spaced from the electrode. The nozzle 24 has a central opening that defines the exit orifice 14 through which a plasma arc can pass. For example, the torch is typically designed to pierce and cut metal (e.g., mild steel) using a reactive gas, such as oxygen or air, as the plasma gas that forms a transferred plasma arc 18. A swirl ring 26 is typically mounted to the torch body 12 and defines a set of radially offset (or canted) gas distribution holes 26*a* that impart a tangential velocity component to the plasma gas flow causing it to swirl around the electrode. This swirl helps to create a vortex that constricts and stabilizes the position of a plasma arc 18, i.e., an ionized gas jet, that passes through the exit orifice 14 and attaches to a workpiece 19 being cut.

In operation, the plasma gas 28 flows through the gas inlet tube 29 and the gas distribution holes in the swirl ring. From there, the gas flows into the plasma chamber 30 and out of the torch through the nozzle orifice 14. A pilot arc is first generated between the electrode and the nozzle and ionizes the gas passing through the nozzle orifice. Arc attachment then transfers from the nozzle to the workpiece to cut the workpiece. It is noted that the particular construction details of the torch body, including the arrangement of components, direction of gas and cooling fluid flows, and providing electrical connections can take a wide variety of forms and the example illustrated is merely a simplified schematic example.

During use, consumable components, such as the nozzle and the electrode can degrade and erode as a result of either high electrical currents that pass through the materials or exposure to high temperatures from the plasma arc. In particular, material loss can be a result of chemical reaction of the oxygen with the base metal and rapid temperature changes of the plasma gas and the emitter during transients. These reactions and changes typically lead to increased volume of molten oxide at the emitting surface and instability, resulting in loss of material.

Conventional hafnium and zirconium thermionic emitters in the electrode in oxygen environments are multiphase composites that are composed of an insert of pure metal that transitions to a thin layer of solid oxide then to a molten oxide that extends to the surface which emits electrons. During start/stop transients, this composite metal/oxide structure undergoes rapid temperature and pressure changes that induce multiple phase changes in the oxide and thermal stresses in the base hafnium or zirconium metal. It is believed that these changes can lead to cracking, spalling, and other structural changes that result in ejection (e.g., losses) of material either alone or in combination with the reduced oxidation rates described above.

However, the concepts discussed herein that can include adding yttrium to the emitter material (e.g., alloying (e.g., mixing or combining) hafnium or zirconium with yttrium) can be helpful to reduce erosion of the thermionic emitters during operation. For example, by adding certain amounts of yttrium to the base material (e.g., hafnium or zirconium) emitter, the stability of the emitter during plasma arc ignition and cutting can be improved (e.g., as the rate at which oxide is formed is decreased). As a result, it is expected that less molten oxide will be ejected during operation by liquid dripping, or ejection at transients. Such a decrease in material loss can result in improved stability and/or a longer (e.g., significantly longer) usable electrode life.

It is believed that the improved performance of the emitter that is alloyed with yttrium may partially result from suppression of the monoclinic to tetragonal phase change in hafnia and zirconia. That is, as depicted in the hafnia-yttria phase diagram in FIG. 2 (which is an annotated excerpt from Stacy, D. and Wilder D., Journal of the American Ceramic Society, Vol. 58, No. 7-8 pg. 287) with hafnia (i.e., hafnia without yttrium added), a phase change occurs (i.e., atoms can begin to rearrange) at or about 1,750 degrees Celsius (° C.). Temperatures high enough to induce this phase change can be present at the surface portion of an emitter and result in thermal stresses in a hafnium emitter (e.g., in a surface portion of the emitter) as the emitter is heated during ignition. In particular, during ignition and use, a molten pool forms at the surface portion of the emitter from which the plasma arc is emitted. Therefore, as the temperature increases from ambient temperature towards the high temperature (which the molten pool can reach during use), the temperature of the emitter passes through this transitional phase change temperature (e.g., the approximate 1,750° C.)

and as a result, atoms begin to rearrange and cracking can occur within the emitter as the material undergoes this temperature transition.

Figure 2:
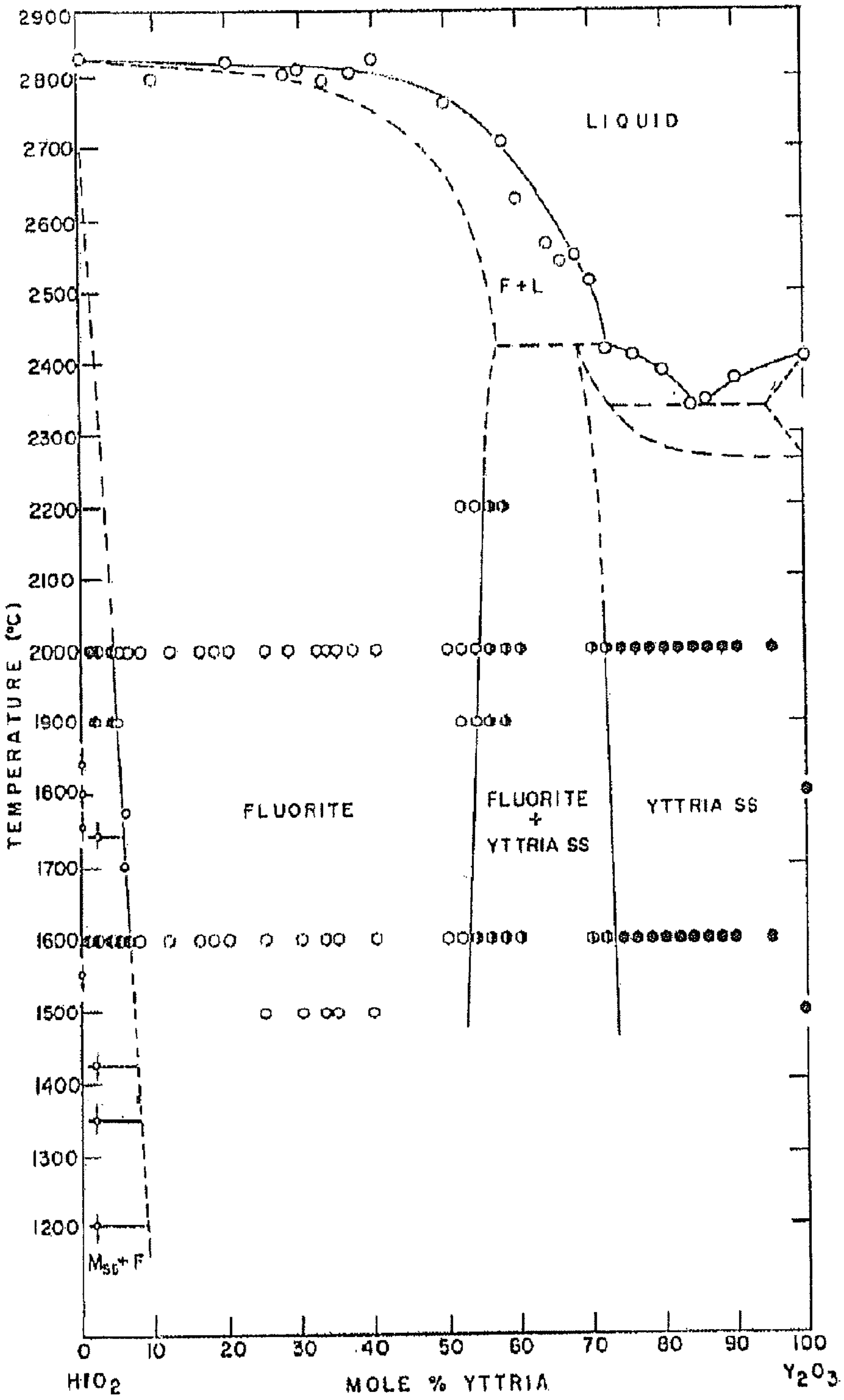
FIG. 2 is a hafnia-yttria phase diagram depicting estimate phase change temperatures for various hafnia-yttria alloys.

This is in contrast to the addition of yttrium to the hafnium which can cause the resulting alloyed material to undergo no phase changes prior to melting of the surface portion of the emitter insert as in the present application and depicted in the phase diagram. That is, the addition of certain amounts of yttrium to the hafnium is thought to, at least partially, alter the material properties in the surface portion of the emitter such that as the emitter is heated and the temperature rises from ambient temperature to the temperature expected to be reached during cutting (e.g., above the melting temperature in the molten pool), the alloyed emitter (i.e., the surface portion) does not undergo a phase change until it reaches the melting temperature. As illustrated in FIG. 2, the melting point for the alloyed emitter is greater than about 2,800 degrees Celsius (° C.) (e.g., about 2,820° C.). Therefore, the cracking that can occur in an emitter made from substantially only hafnium as a result of the phase change undergone during heat up at ignition, and cooling during extinction, is expected to be reduced in an emitter made from hafnium alloyed with yttrium at least in part because such a phase change does not exist for the alloyed material. In some embodiments, the emitter insert material is expected to exhibit the material properties depicted in the phase diagram in FIG. 2 (e.g., in particular, within the shaded region) along the surface portion (e.g., only the surface portion) of the emitter rather than throughout the entire emitter material.

As a result of the general absence of the cracking due to a solid phase change, material degradation on a macro scale, such as material cracking, spalling (which is typically not achieved using yttria rather than yttrium), or ejection from the electrode can be limited. As discussed herein and illustrated below with respect to the observed experimental results, such reduced material degradation can result in improved (e.g., significantly improved) electrode life. While Applicants believe the reduced cracking theory may contribute, at least in part, to the increased usable life of the plasma arc electrode emitters including yttrium, other contributing factors can include reduced oxidation of the base metal (e.g., the hafnium or zirconium) as described herein.

Figure 3:
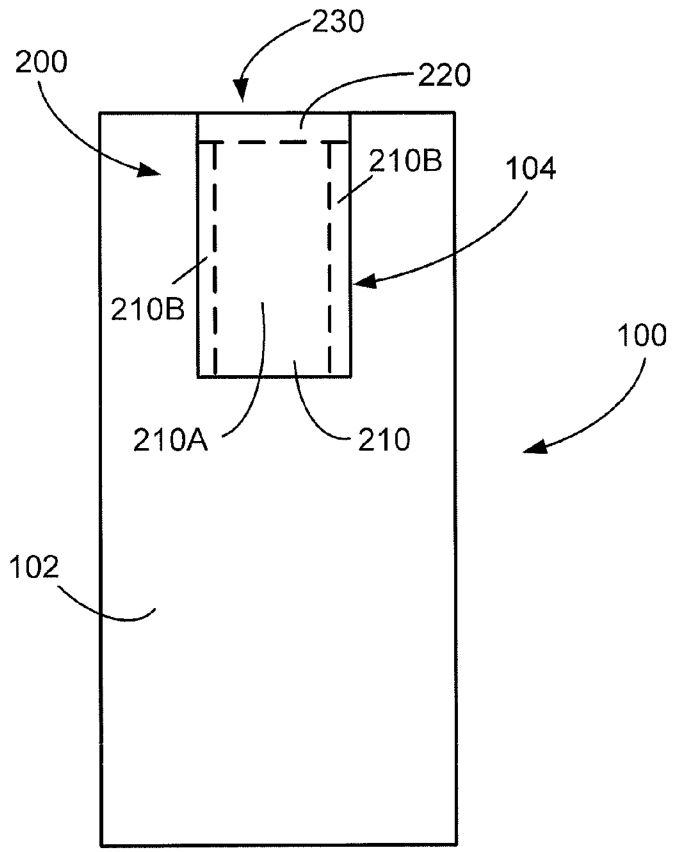
FIG. 3 is a cross-sectional schematic side view of an electrode for a plasma arc torch having an example emitter formed of a metallic material including yttrium.

Referring to FIG. 3, in some embodiments, an electrode 100 for a plasma arc torch (e.g., the torch 10) can include an electrode body 102 and an emissive insert (e.g., emitter) 200. The electrode body 102 can be formed of a metallic material, such as copper or aluminum, and define a first (distal) end and a (second) proximal end. A bore 104 can be formed at the first end in which the emitter 200 can be disposed. In some embodiments, the emitter 200 can be in direct contact with the electrode body 102. Specifically, the emitter 200 can contact the electrode body 102 without requiring the presence of an intermediate structure (e.g., a sleeve) for adequate heat removal from the emitter.

The emitter 200 can be formed of any of various material compositions that incorporate the yttrium. For example, the emitter 200 can be formed of a multi-metallic material composition (e.g., a combination of two or more metals) where one of the metal materials is metallic, non-oxidized yttrium. That is, as used herein, the term multi-metallic is typically distinguished from a combination of ceramic or otherwise oxidized material combinations, such as a combination of powdered or pulverized yttrium oxide (e.g., a mixture of pulverized hafnium and yttrium oxide formed by powder-metallurgy methods), because as discovered by the Applicants of the present application and discussed below, metallic yttrium can be easier and more efficient to manufacture than yttrium-oxide.

The amount of metallic (e.g., non-oxidized) yttrium included in the emitter can vary based on various considerations. For example, the multi-metallic composition can include at least about 5 percent by weight (weight percent) to about 50 weight percent of yttrium (e.g., metallic, non-oxidized yttrium). In some embodiments, the emitter can include about 8 weight percent to about 35 weight percent yttrium (e.g., about 10 weight percent to 33 weight percent, about 10 weight percent to 30 weight percent, about 12 weight percent to 25 weight percent, about 8 weight percent to about 25 weight percent, about 15 weight percent to about 25 weight percent, about 20 weight percent to 35 weight percent, about 20 weight percent to 30 weight percent, about 18 weight percent to 25 weight percent, about 20 weight percent to 25 weight percent, and various other amounts of yttrium).

It is noted that additions of yttria (i.e., oxide form of yttrium) have been previously used to increase the thermal stability of hafnia and zirconia ceramics by reducing (e.g., eliminating) the monoclinic to tetragonal phase change. However, the increased usable life of the electrode emitters described herein appears to be less dependent on oxide stability. Yttria additions, which stabilize the fluorite phase in hafnia, are of benefit for reducing cracking when the oxide is thermally cycled. In a plasma arc torch this would be expected to occur during initiation and termination of the arc. However, weight loss data observed during testing and provided in Table i below demonstrate that yttrium metal additions offer significant benefits without thermal cycling, and that the benefit may decrease as the number of thermal cycles increase. In some cases, it appears that additions of elemental yttrium may offer additional benefits beyond those associated with the increased thermal stability of the oxide discussed above.

Table i below provides a comparison of weight loss testing data performed with two different types of plasma arc torch electrode emitters (e.g., pure hafnium emitters and emitters made of hafnium with 20 weight percent yttrium). The electrodes were operated for 2 hours of arc-on time at 260 amps for different time durations. The different time durations included 2 hours (1 on/off cycle), 60 seconds (120 on/off cycles), 20 seconds (360 on/off cycles), and 4 seconds (1800 on/off cycles). As depicted in the Table i below, observed benefits of yttrium metal additions appeared to decrease with increasing number of on/off cycles. It is this decreased benefit with the respect to the on/off cycling that suggests that the benefits of adding yttrium is more dependently related to reduced oxygen model rather than the reduced thermal cracking. However, both material property improvements may contribute.

TABLE i

Comparison of weight loss test data

| Total Arc on Time (hrs.) | # on/off cycles | Weight loss (grams) Hf-20Y | Weight loss (grams) Hf | % Decrease Weight Loss With 20Y |
|---|---|---|---|---|
| 2 | 1 | 0.0067 | 0.0144 | 53 |
| 2 | 120 | 0.0037 | 0.0129 | 71 |
| 2 | 360 | 0.0088 | 0.0225 | 61 |
| 2 | 1800 | 0.0258 | 0.0393 | 34 |

It is noted that in some embodiments, yttria (yttrium oxide (i.e., $Y_2O_3$)) typically includes only about 78.7 weight percent of yttrium (Y). Therefore, even if one skilled in the art were to consider an emitter formed of hafnium combined with yttria to include metallic, non-oxidized yttrium as yttrium is a component of yttria, the amount of actual yttrium would be less than that of yttria. For example, if a composition is formed of 10 weight percent yttria, the composition would include only about 7.87 weight percent metallic yttrium. Additionally, if a composition includes 14 weight percent yttria, the composition would only include about 11 weight percent metallic yttrium.

In some aspects, as discussed above, the inclusion of yttrium as a component in the multi-metallic material composition in the emitter can impact temperature phase change properties of the emitter. Specifically, yttrium can help maintain (or increase) the melting temperature of a hafnium or zirconium emitter. For example, in some embodiments, an alloy (mixed material) formed at an exposed surface of the emitter can have a liquid phase change temperature (e.g., melting point) of greater than about 2,800 degrees Celsius. As illustrated in FIG. 2, in some cases, when alloyed with hafnia (hafnium oxide), about 10 mole percent of yttria (e.g., about 7.87 mole percent yttrium) to about 30 mole percent of yttria (e.g., about 23.61 mole percent yttrium) is able to maintain a melting temperature of above about 2800 degrees Celsius. Similarly, in some embodiments, the alloyed material along the exposed surface of the emitter can have an atomic arrangement that is stable (e.g., substantially consistent) below a temperature of about 2,800 degrees Celsius. For example, the substantially consistent atomic arrangement can include material that maintains a fluorite phase during temperature increases of up to 2,800 degrees Celsius. It is believed that, in some cases, the substantially consistent atomic arrangement can reduce thermal cracking of the alloyed material.

Other materials can also be included in the multi-metallic material. For example, the multi-metallic material insert can include at least one of calcium or magnesium either in addition, or alternatively to, yttrium as described herein.

More stable (e.g., oxidation resistant) material compositions formed in the alloyed material can help to reduce material loss of the emitter, for example, in oxygen-rich environments where conventional emitters may be more prone to degrade. It is noted that even in cases where additional oxygen is not specifically introduced (e.g., in manual cutting), oxygen is still present in atmospheric air. Therefore, use of the term oxygen-rich within this application is not restricted to only mechanized cutting applications that introduce additional oxygen but rather covers both mechanized and atmospheric cutting. In some embodiments, the emitter can have a material loss rate of less than about 12 nanograms per coulomb (e.g., less than about 10 nanograms per coulomb, less than about 8 nanograms per coulomb, less than about 5 nanograms per coulomb, or less than about 4 nanograms per coulomb). Material loss can occur as a result of any of various types of material deteriorations. For example, material losses can occur due to material erosion, liquid dripping, spalling (e.g., flaking), cracking, material discharge or expulsion, or any of various other material losses, alone or in combination with one another.

Additionally, the emitters described herein can be used (e.g., sized and configured for use) in coordination with operating current densities that are lower than some other conventional inserts and electrodes. For example, in some embodiments, in part as a result of the addition of yttrium as described herein, it is expected that the emitters described herein can withstand heat and wear better than other conventional inserts and can therefore be sized larger (e.g., wider having an exposed surface area with a greater area) than inserts without yttrium. As a result, in some embodiments, the emitters described herein can define a surface area (e.g., an exposed emissive surface area) having a size that is selected in coordination with an operating current carried by the electrode so that a current density during cutting is less than about 60,000 amperes/inch$^2$. For example, the current density during cutting can be between about 30,000 amperes/inch$^2$ and about 55,000 amperes/inch$^2$ (e.g., about 30,000 amperes/inch$^2$ and about 55,000 amperes/inch$^2$, about 30,000 amperes/inch$^2$ and about 37,000 amperes/inch, about 35,000 amperes/inch' and about 37,000 amperes/inch$^2$, about 36,000 amperes/inch$^2$).

As discussed below, various compositions and structural combinations are possible to form the emitter 200.

Figure 4:
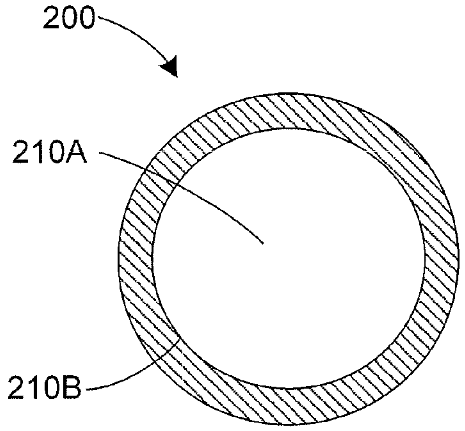
FIG. 4 is a cross-sectional schematic end view of an electrode for a plasma arc torch having an example emitter formed of a metallic material including yttrium illustrating an example region of yttrium disposed around a metallic core region.

In some embodiments, referring to FIGS. 3 and 4, the emitter 200 can be formed of an emitter body including an inner (proximal) portion 210 and an outer (distal) portion 220 where the inner portion 210 is formed of the multi-metallic material composition and the outer portion 220 can be formed of an alloyed material (e.g., an emitter alloy) formed of the metals of the multi-metallic material composition. The multi-metallic inner portion 210 (and in some embodiments also the outer portion 220) can include non-alloyed, discrete regions 210B (e.g., deposits, segment, depositions) of metallic yttrium. The discrete regions 210B can be disposed within or around one or more portions of a base material 210A. The base material can include any of various suitable materials configured to serve as a plasma arc emitter, such as, for example, hafnium or zirconium. As discussed below and illustrated in FIGS. 4-12, the discrete regions 210B can be arranged in any of various different configurations.

The distal portion (e.g., thermionic emitter surface layer) 220 can define an exposed surface 230 that is configured to support a plasma arc generation and emit a plasma arc from the electrode. As discussed herein, in some examples, the outer portion 220 can be formed from the multi-metallic material composition of the inner portion 210. In some cases and manufacturing methods, the outer portion can be formed after a use (e.g., an operational usage) of the electrode 100, such as when the electrode is fired up in a plasma arc torch such that a plasma arc is generated and emitted from emitter 200. For example, generation of a plasma arc is expected to create an amount of heat within the emitter, particularly at the end region, sufficient for diffusion mixing (e.g., melting and mixing) of the multi-metallic composition to occur and form an alloy. As a result, the second portion 220 can have a material composition that is different than the material composition of the non-exposed portion 210.

In some aspects, forming emitters in this manner by creating a multi-metallic emitter body, which can be free of oxide forms of the metallic materials (e.g., substantially free of oxygen), and then heating the emitter (e.g., by firing the electrode in which the emitter is disposed) to form the alloyed surface can be easier and more effective than some other existing forms of making emitters formed in part of multiple materials. For example, in some previous emitters, powdered metallurgy has been used to combine powdered yttrium oxide (e.g., ceramic yttria) particles with hafnium particles to form an emitter. However, the ceramic yttria dispersed throughout the entire length of the resulting emitter may cause the emitter to be brittle and also to be a poor heat conductor. In some cases, poor heat conduction of the insert can require use of a heat conducting sleeve between the insert and the electrode body, which can make the electrode more expensive to manufacture. Whereas, the emitters described herein can have an inner region formed of substantially only metallic materials that can serve as better heat conductors.

Example Emitter Material Compositions

The distribution of yttrium within the electrode insert can be arranged (e.g., spread out, distributed, deposited, mixed, or otherwise arranged) within the base material (e.g., hafnium, zirconium, or other emissive material) in any of various patterns or configurations.

For example, in some cases, an emitter slug can be formed of a premade alloy material of the desired yttrium weight percentage. In some embodiments, the alloy material is formed by a hafnium-yttrium alloy wire. In some cases, hafnium-yttrium alloy wire can be manufactured more easily (e.g., and/or less expensively) than some other hafnium-yttria alloy wire. For example, Applicants have discovered that, in some cases, yttrium (i.e., metallic yttrium) can be more workable (e.g., malleable, machinable) than other materials, and therefore, emitters formed at least in part of a yttrium-hafnium alloy can be formed more easily by combining portions of yttrium with portions or hafnium rather than working with other materials, such as those combined by powdered metallurgy.

Alternatively, the emitter (e.g., an emitter slug) can be in the form of a composite material (e.g., a multi-metallic composite material) containing one or more discrete yttrium deposits or regions within the base material in any of various configurations. During an operational usage of the electrode in which the emitter is disposed, such as a plasma arc ignition sequence (e.g., the first time the electrode is used to ignite a plasma arc), a portion or all of the composite emitter can reach temperatures in which diffusional mixing will occur. As a result of the mixing, the composite material can then form the blended alloy material. In some examples, the surface layer portion 220 can melt after an operational usage to form the emitter alloy.

The composite material to form the emitter can take various shapes and forms. For example, FIG. 4 illustrates an example emitter slug 200 that is formed of a core region (e.g., a central core region) 210A formed of the base material, such as hafnium or zirconium. A region of yttrium 210B is disposed to at least partially surround the core region 210A. In some embodiments, the emitter slug can include a base material cylinder or wire that is coated (e.g., jacketed) with yttrium to form a coaxial composite material in which yttrium is disposed around peripheral regions of the core region 210A. During an operational usage, high temperatures encountered near the exposed surface region of the emitter (e.g., the layer 220) can induce mixing of the core region 210*a* and surrounding region 210*b* to form the emitter alloy. In some embodiments, a remaining region of the emitter (e.g., the inner portion 210) can at least in part retain discrete regions of yttrium and base material.

Testing was performed to compare the usable lives (i.e., number of cycles to failure) of differently formed emitters. In particular, a pure hafnium emitter, a coaxial composite emitter formed of a hafnium core with an outer yttrium jacket, and an emitter formed of a hafnium-yttrium alloy were all tested. Both the coaxial emitter and the alloyed emitter were formed of 20 weight percent yttrium.

The testing included cycling a plasma arc (e.g., igniting a plasma arc, maintaining the arc for 20 seconds, and then terminating the arc) until the emitter failed to operate. In this example, failure was considered to be inability to maintain an arc. As provided in Table ii below, the coaxial composite emitter performed for more cycles than the pure hafnium emitter. However, under the tested conditions, the pure alloyed emitter performed for more cycles than the coaxial composite emitter.

TABLE ii

Comparison of cycle life for various emitter configurations.

| Emitter Configuration | Cycles to Failure |
|---|---|
| Pure Hf | 900 |
| Coaxial, Hf jacketed with Y (Hf-20Y) | 1289 |
| Alloyed (Hf-20Y) | 1905 |

The emitter can include the yttrium portions 210 to any of various depths (e.g., distances) from an exposed face of the emitter. For example, in some embodiments, the yttrium may be disposed along an entire length of the emitter. Alternatively, in some embodiments, the yttrium can be disposed only along a portion of the length of the emitter. For example, the emitter may include yttrium only to depths that would become the exposed emissive surface layer during use. In some cases, the exposed portion of the emitter that can melt to define the emissive surface layer can have a thickness that is less than 0.070 inches (e.g., less than 0.05 inches, 0.04 inches, 0.03 inches, or 0.02 inches).

Figure 5:
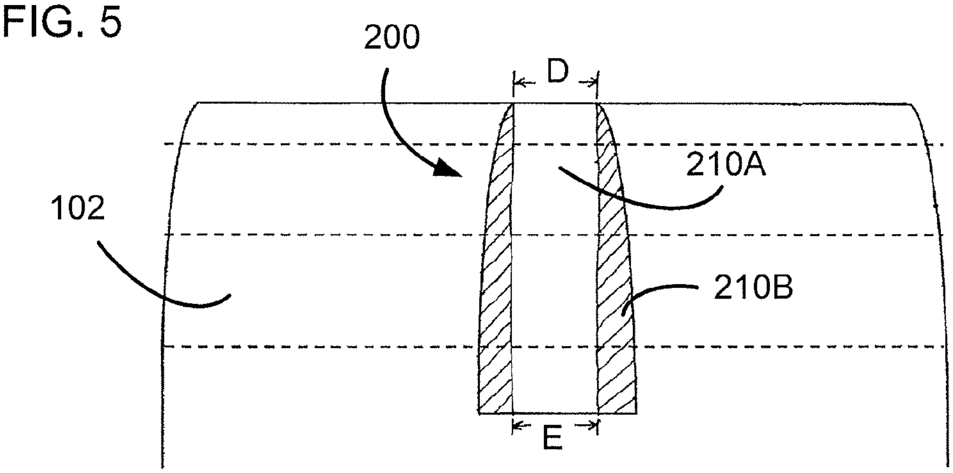
FIG. 5 is a cross sectional side view of an electrode having an example emitter formed of an outer yttrium portion that varies along a core region that has a consistent width.
Figure 6:
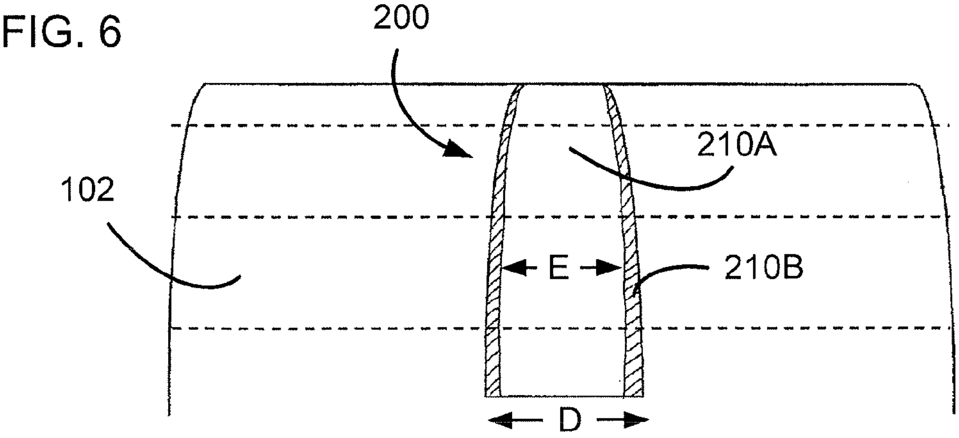
FIG. 6 is a cross-sectional side view of an electrode having an example emitter including yttrium where a cross-sectional thickness of both an outer yttrium and a core region can vary along an axial length of the emitter.
Figure 7:
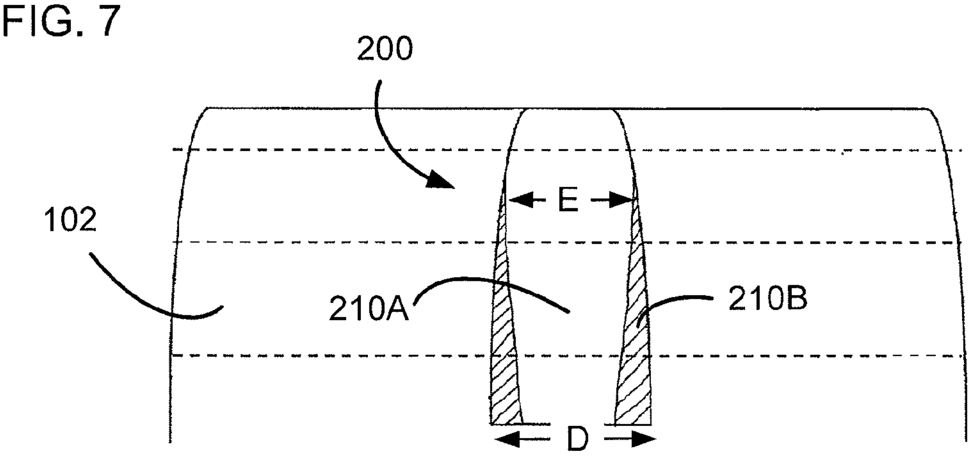
FIG. 7 is a cross-sectional side view of another example electrode having another example emitter formed of a metallic material including yttrium where a cross-sectional thickness of both an outer yttrium portion and a core region can vary along an axial length of the emitter.

While it is possible to form the emitter from a full cylinder of the base material surrounded by a generally constant cylinder of yttrium, other examples are possible. Referring to FIG. 5, for example, an emitter 200 can be formed of a generally cylindrical base material core region 210A having a substantially consistent width (e.g., diameter) E. An outer yttrium portion 210B can be disposed around the core region and have a width (e.g., diameter) D that increases as a distance from an end face of the emitter increases (e.g., into the electrode body). While the increasing width D of the yttrium portion 210B is generally illustrated as being substantially curved (e.g., parabolic or bell-shaped), other embodiments are possible. For example, in some embodiments the emitter can be frusto-conical. Additionally or alternatively, in some cases, the outer width D of the yttrium portion 210B can be substantially constant and an outer width E of the core region can vary.

In some embodiments, the width of both portions (e.g., the width E of the core region 210A and the width D of the yttrium portion 210B) can vary along the length of the emitter. For example, referring to FIG. 6, in some embodiments, the width E of the core region 210A and the width D of the yttrium portion 210B can both increase as the distance from the end face of the emitter increases to form a tapered shaped core region 210A and/or yttrium portion 210B.

Alternatively, along any of various regions of the emitter, the width D of the yttrium portion 210B can increase as the width of the core region 210A decreases. For example, referring to FIG. 7, in an inward portion, the emitter can include a yttrium portion 210B that increases in width D as the distance from the end face of the emitter increases while the width E of the core region 210A decreases along the same distance. Additionally or alternatively, as illustrated, in some embodiments, the emitter may have an exposed end region (or other regions) formed of substantially only a core region 210A that is not surrounded by the yttrium portion 210B. In some cases, the end region of the core region 210A that is not surrounded by the yttrium portion may also have a width E that increases as the distance from the end face of the emitter increases.

Any of other various configurations of increasing and decreasing widths of the base material portions and/or the yttrium portions are possible.

Figure 8:
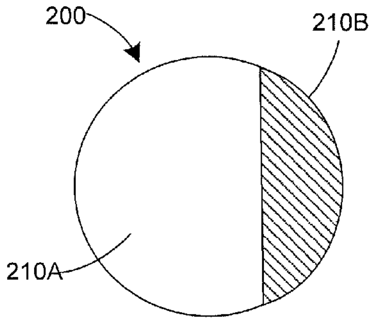
FIGS. 8-12 are cross-sectional views of other example electrode composite emitter structures illustrating example distributions of yttrium within a base material.

Additionally, while certain examples have been described in which the multi-metallic material is formed of a base material core and an outer yttrium portion, any of various other combinations of yttrium and base material (e.g., hafnium or zirconium) are possible. Referring to FIG. 8, in some embodiments, a composite emitter slug 200 can have a first side region formed of yttrium 210B and a second side region formed of the base material 210A.

Figure 9:
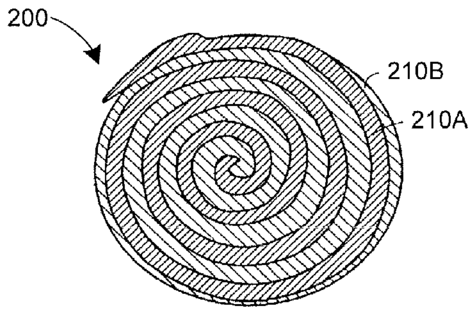

Referring to FIG. 9, another example emitter 200 configuration can include a composite structure having two or more adjacent layers of yttrium material 210B layered along a base material 210A. In some cases, the composite emitter 200 can include a bimetallic strip (e.g., hafnium clad or plated onto a strip of yttrium (or vice versa)). The two layers can be rolled up to form a "jelly roll" structure.

Figure 10:
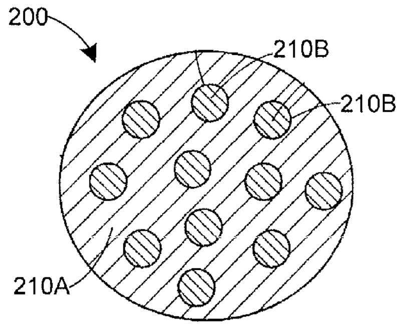

Referring to FIG. 10, another example emitter 200 configuration can include a composite structure made of a generally cylindrical member 210A formed of the base material. Multiple generally parallel bars 210B formed of yttrium can be disposed in a spaced arrangement base material cylinder 210A.

Figure 11:
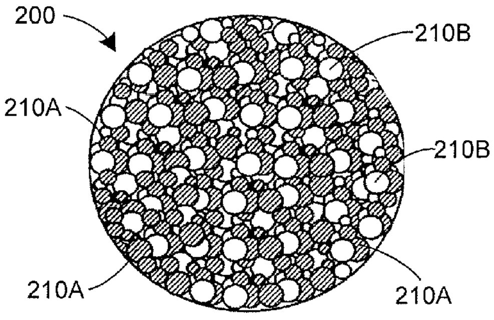

Referring to FIG. 11, another example emitter 200 configuration can include a composite structure formed by sintering a composite powder mixture of including grains of yttrium material 210B dispersed throughout and mixed within grains of the base material 210A.

Figure 12:
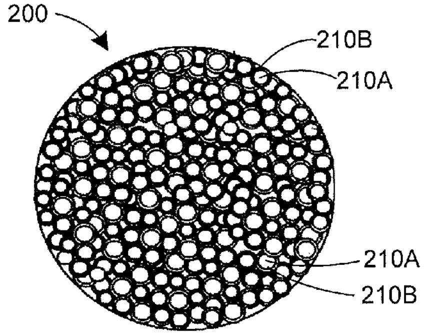

Referring to FIG. 12, another example emitter 200 configuration can include a composite formed of a mixture (e.g., a powder mixture) of one or more base material beads or grains 210A that are partially or fully coated with the yttrium material 210B.

The dimensions of the example emitters can vary and are typically determined as a function of the operating current level of the torch, the size of the electrode, and the plasma gas flow pattern in the torch.

As discussed above, the composite emitters can create the yttrium-hafnium alloy material along an exposed end during or after a use (e.g., after the initial arc is formed) as a result of high temperature diffusional mixing of a portion of the composite emitter.

EXPERIMENTAL RESULTS

Several experimental tests were performed to analyze example electrodes having emitters made from hafnium with alloyed yttrium. In particular, electrodes with emitters of varying yttrium concentrations were tested relative to one another, as well as to an electrode having no yttrium. It is noted that the electrodes discussed below that were modified to include alloyed emitters had emitter inserts with an exposed surface area that was approximately 40% larger than the exposed surface area of the typical emitter having no yttrium. While an alloyed emitter that is substantially similar in size to an unmodified emitter with no yttrium is expected to perform better (e.g., have a lower material erosion rate) than the unmodified emitter, the substantial benefits (such as substantially longer life), are expected to be achieved when the alloyed emitter has a surface area that is larger (e.g., about 40% larger) than an unmodified emitter for a substantially similar electrode or expected plasma torch power.

20 Second Cycle Life Tests—260A Oxygen Plasma

For example, in one test, test electrodes having emitters made with 0-35 weight percent yttrium were tested. In particular, model HPR260 electrodes from Hypertherm, Inc. from Hanover, N.H. were modified with the alloyed emitters and subjected to 20 second cycle lives until they each failed. That is, each electrode was installed into a test torch, ignited, operated for 20 seconds, and then turned off. This cycle sequence was repeated for each electrode until the electrodes failed. Failure under these tests was determined when the torch was unable to maintain a plasma arc between the emitter and workpiece.

Figure 13:
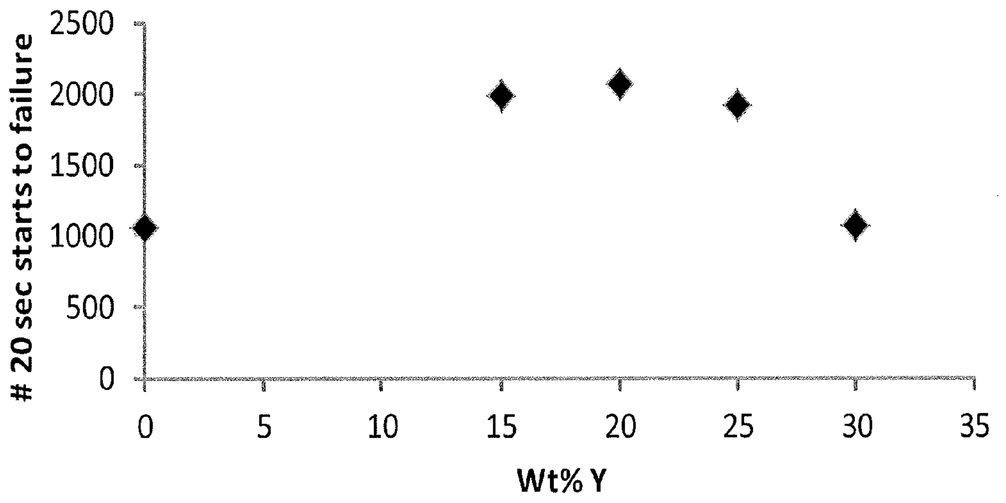
FIGS. 13 and 14 are plots depicting life cycle test results for electrodes having emitters of varying yttrium alloy concentrations.

The results of the cycle testing are depicted in FIG. 13 and indicate that the electrodes made with emitters containing between 15 weight percent yttrium and 25 weight percent yttrium were able to undergo around 2000 cycles before failing, whereas electrodes with emitters made with pure hafnium typically failed at around 1000 cycles.

20 Second Cycle Life Tests—100 A Air Plasma

Figure 14:
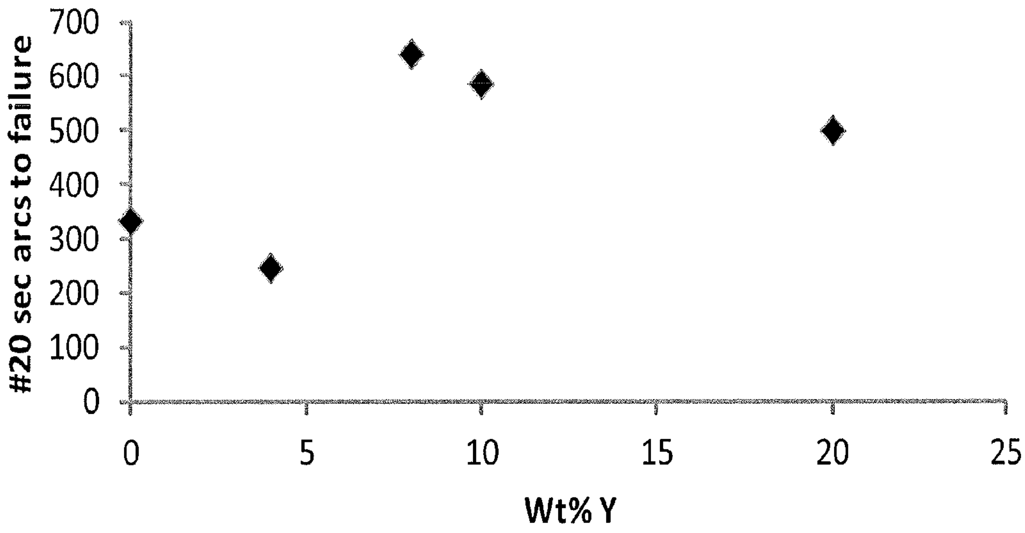

Similar life cycle testing was performed using another type of electrode (i.e., a 100 A air plasma electrode from Hypertherm, Inc. of Hanover, N.H.). As with the HPR260 electrodes, several 100 A electrodes were modified to include emitters made of alloys having yttrium content varying between 0 weight percent yttrium and 20 weight percent yttrium. The respective electrodes underwent repeated 20 second cycles until they each failed. The yttrium within the emitter was found to produce marked improvement in electrode life for contact start, air-cooled, air plasma electrodes. In particular, as illustrated in FIG. 14, the electrodes having emitters made of 8 weight percent yttrium alloy, on average, were able to undergo more than 600 cycles whereas emitters with no yttrium were able to undergo approximately 350 cycles.

Erosion Rate Tests

In addition to cycle life testing, 260 A oxygen plasma electrodes fabricated with emitters of pure hafnium and hafnium with 20 weight percent yttrium were cycled and monitored for pit growth and weight loss as a function of the number of 20 second cycles that the electrode had undergone. Pit depth generally refers to a depth of an indentation or recess that forms along the emitter's face substantially at a region from which the arc is emitted and weight loss refers to changes in the overall weight of the electrode.

Figure 15:
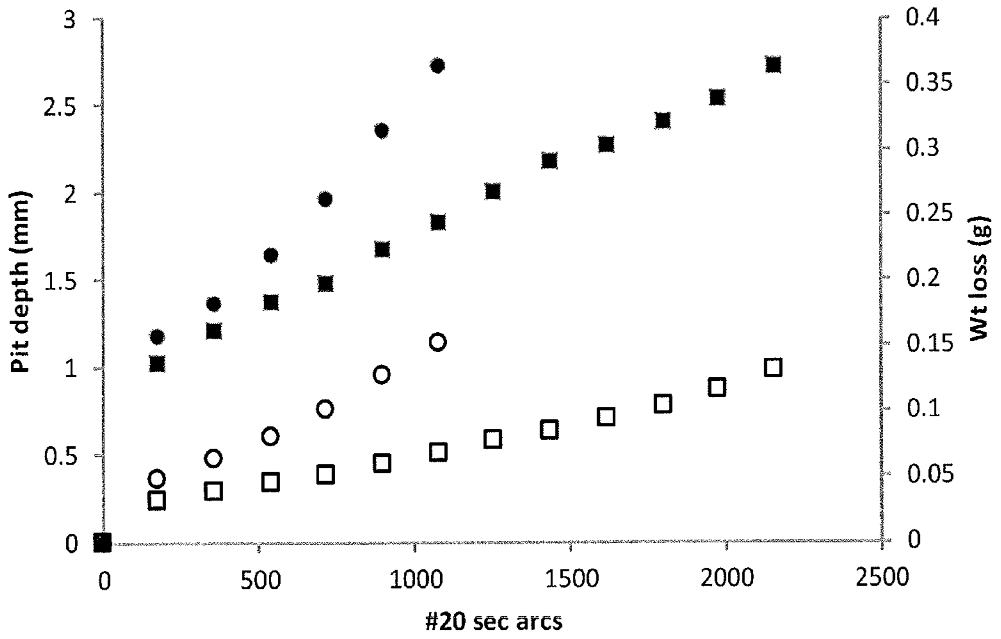
FIG. 15 is a plot depicting weight loss and emitter pit growth test results for electrodes having emitters of varying yttrium alloy concentrations.

As discussed above the emitters alloyed with 20 weight percent are expected to erode more slowly due to a slower oxidation rate than pure hafnium. As illustrated in FIG. 15, the rates for both pit depth growth, and weight loss are reduced (e.g., significantly reduced) with the addition of yttrium to the emitter material. In FIG. 15, circular data points indicate pure hafnium and square data points indicate hafnium alloyed with 20 weight percent yttrium. Additionally, solid or shaded data points indicate pit depth growth (in millimeters) and unfilled, outlined data points indicate weight loss data (in grams). The slow and generally uniform pit growth and weight loss is expected to be beneficial because it allows the electrode to be used for more cycles before reaching an unusable pit depth (i.e., a longer usable life).

While various embodiments have been described herein, it should be understood that they have been presented and described by way of example only, and do not limit the claims presented herewith to any particular configurations or structural components. Thus, the breadth and scope of a preferred embodiment should not be limited by any of the above-described exemplary structures or embodiments, but should be defined only in accordance with the following claims and their equivalents.

What is claimed:

1. An electrode for a plasma arc torch, the electrode comprising:

a body formed of an electrically conductive material, the body having a first end and a second end; and an emissive portion comprising a multi-metallic insert disposed within the first end, the multi-metallic insert including at least two non-oxidized metallic materials combined into a two-phase alloy, one of the non-oxidized metallic materials being about 5 weight percent to about 50 weight percent of metallic yttrium.

2. The electrode of claim 1 wherein the multi-metallic insert comprises at least one of hafnium or zirconium.

3. The electrode of claim 1 wherein the multi-metallic insert is substantially free of oxygen.

4. The electrode of claim 1 wherein, after an operational usage of the electrode, a thermionic emitter surface layer is formed along an exposed surface of the multi-metallic insert, the thermionic emitter surface layer having a composition different than a composition of a non-exposed portion of the multi-metallic insert.

5. The electrode of claim 1 wherein a portion of the multi-metallic insert comprises discrete regions of yttrium.

6. The electrode of claim 1 wherein the multi-metallic insert includes about 12 weight percent to about 25 weight percent yttrium.

7. The electrode of claim 1 wherein the multi-metallic insert includes an emissive surface with a surface area exposed to plasma gas, the emissive surface area having a size that is selected in coordination with an operating current carried by the electrode so that a current density during cutting is between about 35,000 amperes/inch to about 37,000 amperes/inch$^2$.

8. The electrode of claim 1 wherein the multi-metallic insert further comprises at least one of calcium or magnesium.

9. The electrode of claim 1 wherein the two non-oxidized metallic materials are alloyed together.

10. The electrode of claim 1 wherein the multi-metallic insert is in contact with the body.

11. The electrode of claim 1 wherein the multi-metallic insert has an oxygen-rich environment material loss rate of about 5 nanograms per coulomb.

12. The electrode of claim 1 wherein the multi-metallic insert comprises an inner first portion and an outer second portion, the second portion formed of an emitter alloy with a liquid phase change temperature of greater than about 2800 degrees Celsius.

13. A plasma arc torch for a plasma cutting system, the plasma arc torch comprising:

a torch body;

a nozzle disposed within the torch body; and an electrode mounted relative to the nozzle in the torch body to define a plasma chamber, the electrode including:

an electrode body formed of a thermal conductivity material, the electrode body having a first end and a second end defining a longitudinal axis; and an emissive portion comprising a multi-metallic insert disposed within the first end, the multi-metallic insert including at least two non-oxidized metallic materials combined into a two-phase alloy, one of the non-oxidized metallic materials being about 5 weight percent to about 50 weight percent of metallic yttrium.

14. The plasma arc torch of claim 13 wherein the multi-metallic insert includes about 12 weight percent to about 25 weight percent yttrium.

15. A multi-metallic emissive insert shaped to be disposed within a plasma arc torch electrode, the emissive insert comprising:

an exposed emitter surface at a distal end of the emissive insert to emit a plasma arc from the electrode, wherein the emissive insert comprises a first emissive material and about 5 weight percent yttrium to about 50 weight percent yttrium combined into a two-phase alloy.

16. The plasma arc torch of claim 15 wherein the multi-metallic insert includes an emissive surface with a surface area exposed to plasma gas, the emissive surface area having a size that is selected in coordination with an operating current carried by the electrode so that a current density during cutting is between about 35,000 amperes/inch to about 37,000 amperes/inch$^2$.

17. The emissive insert of claim 15 wherein the yttrium and the first emissive material are alloyed in at least one region along the emitter surface after a use of the emitter.

18. The emissive insert of claim 15 wherein the multi-metallic insert includes about 12 weight percent yttrium to about 30 weight percent yttrium.

19. The emissive insert of claim 15 wherein the emitter surface defines a surface area configured to be exposed to plasma gas, the emitter surface area having a size that is selected in coordination with an operating current carried by the electrode so that a current density during cutting is between about 35,000 amperes/inch$^2$ to about 37,000 amperes/inch$^2$.

20. The emissive insert of claim 15 further comprising a thermionic emitter surface layer formed along the emitter surface after at least one usage, the thermionic emitter surface layer comprising a different material composition than a remaining portion of the multi-metallic insert.

21. The emissive insert of claim 15, wherein the emissive insert includes discrete regions of yttrium and hafnium.

22. The emissive insert of claim 15 wherein the elongated emissive insert has a generally cylindrical shape.

23. The emissive insert of claim 15 wherein the first emissive material comprises hafnium or zirconium.

24. The emissive insert of claim 15 wherein the emissive insert is disposed within a plasma arc torch electrode.

25. A method comprising:

forming a multi-metallic region of an emitter insert for a plasma arc torch electrode, the multi-metallic region comprising a first emissive material and about 5 weight percent to about 50 weight percent yttrium metal combined into a two-phase alloy; and disposing the emitter insert in a recess formed at an end of the plasma arc torch electrode.

26. The method of claim 25 wherein the forming the multi-metallic region includes forming discrete regions of the yttrium metal.

27. The method of claim 25 further comprising treating at least a portion of the multi-metallic region, thereby forming an emitter layer comprising a combined region of the base material and the yttrium metal.

28. The method of claim 27 wherein the treating including supplying a current to heat.

29. The method of claim 25 further comprising forming a layer of an alloy of the yttrium metal and the first emissive material.

30. The method of claim 25 further comprising forming an exposed layer comprising yttrium and oxygen.

31. The method of claim 25 wherein the emitter layer has a thickness that is less than about 0.030 inches.

32. The method of claim 25 wherein the multi-metallic region includes about 12 weight percent to about 30 weight percent yttrium.

33. An electrode for a plasma arc torch, the electrode comprising:

an electrically conductive material body having a first end and a second end; and an emissive multi-metallic insert disposed within the first end of the body, the multi-metallic insert formed of at least two non-oxidized metallic materials combined into a two-phase alloy, one of the non-oxidized metallic materials being about 5 weight percent to about 50 weight percent of metallic yttrium.

* * * * *